July 6, 1954          R. J. LE DUC           2,682,898
              CHAIN CUTTER MORTISE CUTTING MACHINE
Filed July 7, 1952                          2 Sheets-Sheet 2

INVENTOR
Richard J. Le Duc
BY Harold E. Cole
Attorney

Patented July 6, 1954

2,682,898

UNITED STATES PATENT OFFICE 2,682,898

CHAIN CUTTER MORTISE CUTTING MACHINE

Richard J. Le Duc, Bridgewater, Mass.

Application July 7, 1952, Serial No. 297,456

1 Claim. (Cl. 144—72)

This invention relates to a mortise or slot cutting machine, especially of the chain mortising type.

One object of my invention is to provide such a machine whereby an endless chain with cutting edges can mortise-cut different articles or pieces of work, whether long or short, and moved either from front to rear or from side to side of the machine.

Another object is to provide such a machine whereby the cutting mechanism may be moved upwardly, away from the work, or downwardly into contact with the work.

A further object is to provide such a machine with upright posts spaced apart on which a carrier for the movable cutting mechanism is movably mounted, so as to provide space for articles to be worked upon in all directions from the cutter.

The foregoing and other objects which will appear as the nature of the invention is better understood, may be accomplished by a construction, combination and operative arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claim.

Figure 1:
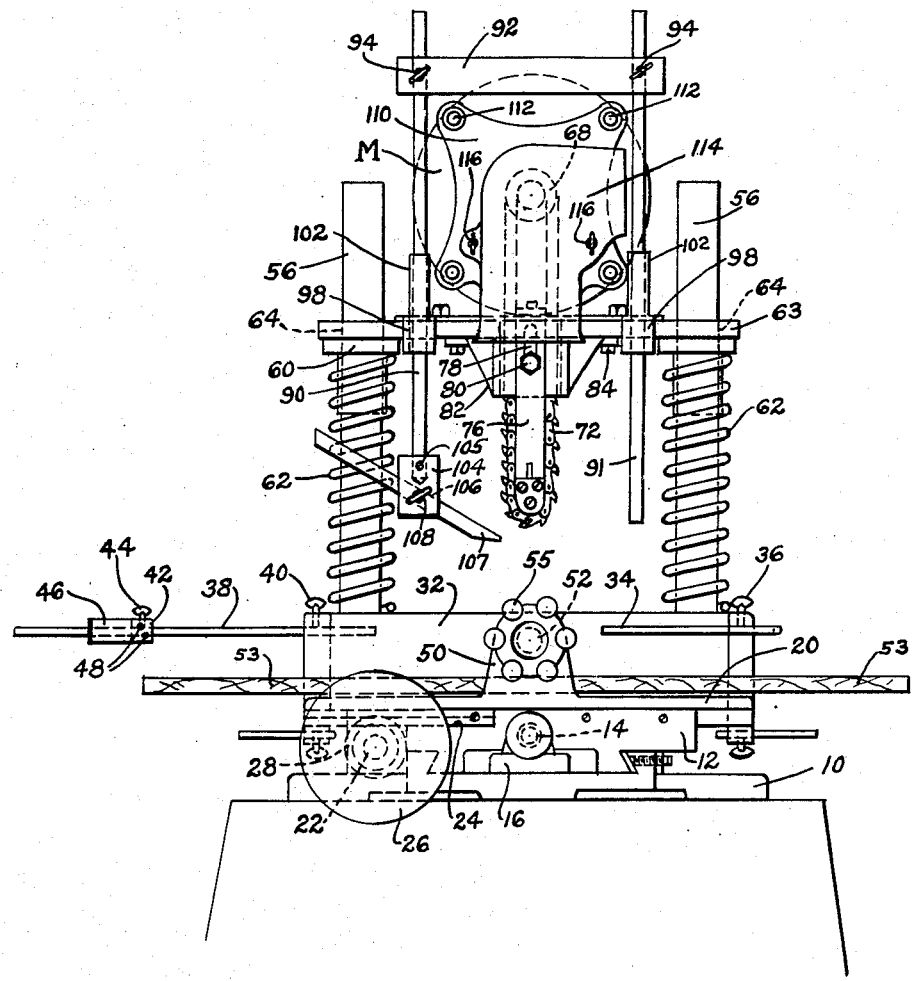
Figure 1 is a front elevational view of my cutting machine.
Figure 2:
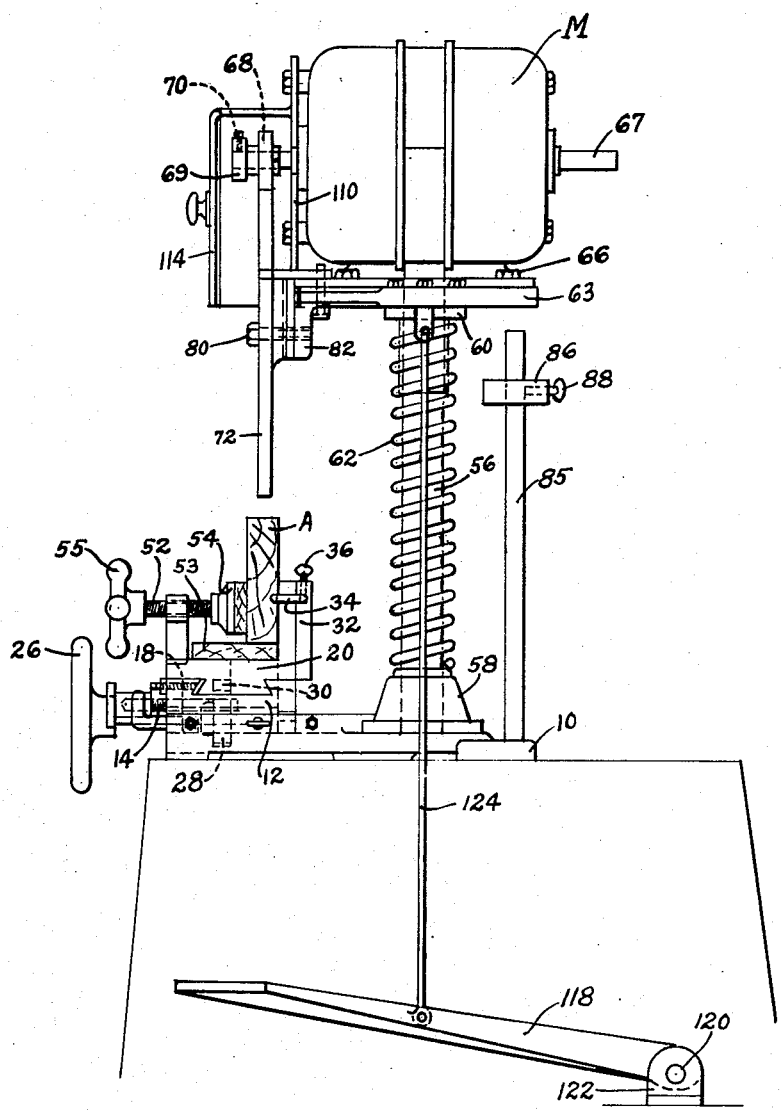
Figure 2 is a side elevational view of said machine.

As illustrated, my cutting machine has supporting means, including a base 10 and an adjustable work support having a lower carriage 12 that can be slidably moved forwardly and rearwardly on said base 10 by a screw 14. The latter extends through a bracket 16 attached to said base 10 and screw-threadedly connected to screw threads 18 opposite a hole in said lower carriage 12. Supported by the latter is an upper carriage 20 that moves sidewise by rotation of a well known travel shaft 22 movably extending through a support 24 attached to said lower carriage 12 and actuated by a handle 26. This shaft 22 has a rack pinion 28 fastened to it which meshes with a rack 30 attached to the under side of said upper carriage 20.

A rear guide 32 extends upwardly from said upper carriage 20 in which is movably mounted, at one side, a stop guide 34 held by a thumb screw 36. At the opposite side is a side rod 38 held by a screw 40 and on which a block 42 is slidably mounted and adjustably held by a screw 44. A spring arm 46 is attached to said block 42, by screws 48, and extends forwardly thereof.

At the front of said upper carriage 20 is a supporting portion 50 with which a screw 52 screwthreadedly connects and extends beyond and is attached to a clamping plate 54. Said screw 52 is actuated by a knob 55.

As shown, the article A to be worked upon rests on a wood block 53 supported by said carriage 20.

In order to freely move a cutting device up and down, I provide carrier means, later described, movably mounted on two upright members or posts 56, spaced laterally apart a substantial distance. These posts have a widened pedestal portion 58 or bottom resting on said base 10 and a separate upper rim with collar 60 at the top. Coil springs 62 movably fit over said posts 56 and collar 60, being compressible when pressure is applied downwardly to said carrier means. These springs bear against said pedestal portion 58 and said upper rim 60 and normally maintain said carrier means in predetermined position.

Said carrier means includes a carrier plate 63 which has holes 64 therein, through which said posts 56 extend, said plate 63 extending between and being freely slidable on these posts.

A cutting device is supported by said carrier means, having actuating means, as shown, in the form of an electric motor M attached to said carrier plate 63 by screws 66. A shaft 67 is rotated by said motor, on the front of which shaft a driving sprocket 68 is mounted and held by a collar 69 attached by a set screw 70. An endless cutting chain 72, having a plurality of cutting members with cutting edges, is rotatably mounted on said sprocket 68. There is a guide bar 76 for said chain 72, having a slot 78 extending therethrough. A screw 80 extends through said slot 78 and attaches said guide bar 76 to a bracket 82 that is attached to said carrier plate 63 by screws 84.

Said cutting chain 72 is forward of said upright posts 56 and also spaced laterally from each, whereby ample space is provided rearwardly of said chain 72 and between said posts 56 for articles to be fed to my machine and mortised or otherwise worked upon. Where relatively long articles are to be slotted laterally, such as fence posts, for instance, this arrangement of a cutting device movable downwardly into contact with an elongate article which extends rearwardly and forwardly of the machine, is advantageous.

Adjacent one of said posts 56 is depth control means including an upright rod 85 supported by said base 10, and extending upwardly. A stop member 86 is movably mounted thereon by means of a screw 88. This stop member 86 is in the path of said carrier plate 63, consequently the latter cannot pass below it, so wherever the stop member is set on said depth rod 85 can determine the depth of the cut into the article being mortised.

At opposite sides of said chain 72 are breaker rods 90 and 91 which adjustably extend through a tie member 92 and are held thereto by screws 94. These rods slidably extend through guide blocks 98 which receive bushings 102 through which the rods also slide.

On said breaker rod 90 is a holder 104 held thereto by a screw 105 having a slot 106 extending diagonally therethrough between opposite sides, through which a chip breaker 107 extends, being adjustably held by a screw 108. This chip breaker 107 is usually made of hard wood and bears on the article being worked upon.

A deflector 110 is attached by bolts 112 to said motor M, and has a cover 114 attached thereto by screws 116.

To operate my machine said carrier means is moved downwardly until the cutting device is in contact with the work or article to be mortised or slotted. This may be accomplished manually, or by simple mechanism such as a foot treadle 118, for instance, pivotally mounted as at 120 in a bearing 122 attached to a floor. A rod 124 extends from said treadle 118 to said carrier plate 63, being attached to both. Rotation of said motor shaft rotates said cutting chain 72.

What I claim is:

A cutting machine comprising supporting means embodying an adjustable work support, a cutting device embodying a motor, a carrier plate supporting said device, two upright posts spaced apart and supported by said supporting means, and coil springs movably mounted on said posts normally supporting said carrier plate, said plate having two holes therethrough and through which said posts extend so that said plate is movable upwardly and downwardly on said posts, said cutting device embodying a cutting chain spaced laterally from and being intermediate said posts, said motor being so positioned that a plane through the longitudinal axes of said posts extends approximately midway between the ends of said motor whereby the cutting chain is sufficiently forward of said posts to provide space for the said work support.

References Cited in the file of this patent

UNITED STATES PATENTS

| Number | Name | Date |
|---|---|---|
| 1,449,083 | Billingsley | Mar. 20, 1923 |
| 1,683,763 | De Walt | Sept. 11, 1928 |
| 2,629,411 | Jones | Feb. 24, 1953 |

FOREIGN PATENTS

| Number | Country | Date |
|---|---|---|
| 8,441 | Great Britain | Apr. 12, 1904 |
| 322,333 | Great Britain | Dec. 5, 1929 |
| 251,195 | Switzerland | July 16, 1948 |
| 942,560 | France | Sept. 20, 1948 |